Patented Feb. 16, 1943

2,311,605

UNITED STATES PATENT OFFICE 2,311,605

MANUFACTURE OF HARD RUBBER ARTICLES

Hugh V. Allison, Fairfield, Conn., assignor to The Allison Company, Bridgeport, Conn., a corporation of Connecticut No Drawing. Application July 8, 1940, Serial No. 344,411

8 Claims. (Cl. 260—774)

This invention relates to new and useful improvements in the manufacture of articles of hard rubber and has particular relation to the manufacture of hard rubber articles of a new compound whereby hard rubber articles of improved strength are provided.

The invention comprises a new compound for the making of hard rubber articles and hard rubber articles made from such compound.

While the invention is particularly useful in the manufacture of abrasive articles in which hard rubber is used as a binder for the abrasive particles or grains, the invention is not restricted to such use and is of general application where hard rubber is used.

It is generally known to the hard rubber compounder that there are few ingredients which may be used to improve the physical properties of hard rubber. With the ingredients generally known for the purpose stated there is much question as to whether the ingredients really accomplish their intended purpose.

Magnesium oxide and calcium oxide have been used to accelerate the cure of hard rubber articles. However, these compounds often impart a brittleness to the finished hard rubber articles. The guanidine types of accelerators have also been used in hard rubber compounding but in such cases the properties of the finished articles are not always the properties desired.

Selenium is a much used accelerator for hard rubber compounding and it is claimed that this chemical also improves resistance to heat and enables the compounder to lower the quantity of sulfur used in the hard rubber compound.

Other ingredients have been used to impart various properties to hard rubber articles. Thus zinc sulfide has been used to improve the impact strength of hard rubber articles and antimony sulfide has been used to raise the yield point of such articles.

According to the present invention zinc selenide in small quantities is compounded with the rubber and sulfur to improve the quality of hard rubber articles. While the proportion of the zinc selenide used is variable the nature of the material is such that it is not practical to use greater than ten parts of the zinc selenide with one hundred parts of rubber, the proportions being by weight.

The proportion of the sulfur may be varied between thirty and sixty-five percent by weight of the rubber content of the compound and the quantity of zinc selenide varies between one-half and ten percent based on the quantity of rubber used. The addition of the zinc selenide improves the strength of the finished hard-rubber articles and assists, i. e., expedites the rate of cure of the hard rubber to some extent.

A desirable and satisfactory compound for my purpose comprises two parts of the zinc selenide to one hundred parts of rubber and from forty-five to fifty parts of sulfur all measurements being by weight of the ingredients used. The mixture is shaped and then vulcanized at temperatures ranging from 130 degrees centigrade to 165 degrees centigrade, depending on the time of vulcanization.

In practicing the invention an abrasive cutting wheel containing ten percent of bonding material has been prepared. The bond in the wheel included forty-five to fifty parts of sulfur to one hundred parts of rubber and two parts of zinc selenide all measurements being by weight. This wheel showed a seventeen percent increase in useful life over a similar wheel containing no zinc selenide. The zinc selenide increased the strength of the cutting wheel and the zinc selenide accelerated the cure and thus reduced the time of vulcanization.

The zinc selenide is milled into the rubber by the general methods now known to rubber manufacturers and it is found that the zinc selenide disperses readily in the rubber on the mill. It is noted that the zinc selenide is sensitive to heat and light and this may explain the beneficial action in hard rubber compounding. Thus the zinc selenide may be changed chemically during the vulcanization but only after the vulcanization temperature has been raised to a certain point. From this it appears that the zinc selenide may act as a delayed action accelerator in the case of hard rubber vulcanization.

Having thus set forth the nature of my invention, what I claim is:

1. A hard rubber article comprising rubber, a high percentage of sulfur, zinc selenide, and the whole beng intimately mixed and vulcanized and the zinc selenide serving to increase the strength of the article.

2. A hard rubber article comprising rubber, from 30 to 65 percent of sulfur, and approximately 2 percent of zinc selenide the whole being intimately mixed and vulcanized at a temperature in the neighborhood of 150 degrees centigrade or higher and the zinc selenide serving to increase the strength of the article.

3. A hard rubber article resulting from the vulcanization of rubber with a percentage of sulfur sufficient to make hard rubber and a relatively small percentage of zinc selenide, the percentage of sulfur and zinc selenide being based on the amount of rubber used.

4. A hard rubber article resulting from the vulcanization of rubber with a percentage of sulfur sufficient to make hard rubber and not less than one-half of one percent of zinc selenide based on the rubber content.

5. A hard rubber article resulting from the vulcainzation of rubber with a percentage of sulfur sufficient to make hard rubber and not more than ten percent of zinc selenide based on the rubber content.

6. The method of accelerating the vulcanization of hard rubber mixtures containing a high percentage of sulfur sufficient to form hard rubber, which comprises incorporating in the mixture before vulcanization about one-half of one percent to ten percent of zinc selenide.

7. The method of making hard rubber products, which comprises vulcanizing rubber mixtures with a percentage of sulfur sufficient to form hard rubber and with the addition of a sufficient amount of zinc selenide to increase the strength of the finished products but not exceeding ten percent by weight of the rubber.

8. The method of accelerating the vulcanization of hard rubber mixtures containing a high percentage of sulfur sufficient to form hard rubber, which comprises incorporating in the mixture before vulcanization about one-half of one percent to two percent of zinc selenide.

HUGH V. ALLISON.